US012576343B2

(12) United States Patent　　(10) Patent No.:　US 12,576,343 B2
Hirata et al.　　　　　　　　　(45) Date of Patent:　　Mar. 17, 2026

(54) COMMUNICATION SYSTEM FOR COMMUNICATION BETWEEN WEARABLE CONTROLLER AND REMOTE TARGET

(71) Applicant: Sony Interactive Entertainment Inc., Tokyo (JP)

(72) Inventors: Shinichi Hirata, Kanagawa (JP); Hitoshi Nakamura, Tokyo (JP); Yuuichi Machida, Kanagawa (JP); Toru Kuronuma, Kanagawa (JP); Takuya Kuji, Tokyo (JP); Maito Omori, Tokyo (JP); Toshiyuki Ando, Tokyo (JP); Yumi Ueda, Chiba (JP); Takeshi Asano, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/711,407

(22) PCT Filed: Dec. 3, 2021

(86) PCT No.: PCT/JP2021/044571
§ 371 (c)(1),
(2) Date: May 17, 2024

(87) PCT Pub. No.: WO2023/100375
PCT Pub. Date: Jun. 8, 2023

(65) Prior Publication Data
US 2025/0050236 A1　　Feb. 13, 2025

(51) Int. Cl.
*A63H 30/00*　　(2006.01)
*A63H 3/36*　　(2006.01)
*G06F 3/01*　　(2006.01)

(52) U.S. Cl.
CPC ............... *A63H 30/00* (2013.01); *A63H 3/36* (2013.01); *G06F 3/014* (2013.01); *G06F 3/016* (2013.01); *G06F 3/017* (2013.01); *A63H 2200/00* (2013.01)

(58) Field of Classification Search
CPC ...... A63H 2200/00; A63H 3/36; A63H 30/00; G06F 3/01; G06F 3/014; G06F 3/016; G06F 3/017
See application file for complete search history.

(56) References Cited

U.S. PATENT DOCUMENTS

| | | | |
|---|---|---|---|
| 8,368,641 B2 * | 2/2013 | Tremblay | G10H 1/34 715/702 |
| 8,571,707 B2 * | 10/2013 | Hu | A63H 3/14 700/62 |

(Continued)

FOREIGN PATENT DOCUMENTS

| | | |
|---|---|---|
| JP | 2002232317 A | 8/2002 |
| JP | 2005328270 A | 11/2005 |

(Continued)

OTHER PUBLICATIONS

Application No. JP2023-564721, Office Action, Mailed on Dec. 20, 2024, 10 pages.

(Continued)

*Primary Examiner* — William H McCulloch, Jr.
*Assistant Examiner* — William H McCulloch
(74) *Attorney, Agent, or Firm* — Kilpatrick Townsend & Stockton LLP

(57) ABSTRACT

Provided is a communication system including a controller installed on a hand of a user, an operation target remotely operated by the controller, and a relay apparatus that performs relaying between the controller and the operation target, in which the controller includes a first detection section that detects a motion of fingers of the user, a stimulus (Continued)

providing section that provides an external stimulus to the fingers of the user, and a control section that controls the stimulus providing section, the operation target includes a driving section that performs an action in reference to action information received, and a second detection section that detects the external stimulus to the operation target, and the relay apparatus transmits, to the operation target, the action information based on a detection result from the first detection section, and in reference to a detection result from the second detection section, transmits, to the controller, stimulus provision information for controlling the stimulus providing section to provide an external stimulus to the user.

12 Claims, 10 Drawing Sheets

(56) References Cited

U.S. PATENT DOCUMENTS

| | | | | |
|---|---|---|---|---|
| 8,823,639 | B2 * | 9/2014 | Jackson | G06F 3/0425 |
| | | | | 345/173 |
| 8,909,370 | B2 * | 12/2014 | Stiehl | B25J 9/1671 |
| | | | | 700/264 |
| 9,245,428 | B2 * | 1/2016 | Weddle | G06T 19/006 |
| 9,552,056 | B1 * | 1/2017 | Barry | B25J 9/1689 |
| 9,625,333 | B2 * | 4/2017 | Jentoft | G01L 1/02 |
| 9,753,540 | B2 * | 9/2017 | Weddle | G06F 3/016 |
| 9,919,429 | B2 * | 3/2018 | Ishiguro | B25J 11/0015 |
| 9,996,153 | B1 * | 6/2018 | Trotta | G06F 3/014 |
| 10,203,762 | B2 * | 2/2019 | Bradski | H04N 21/414 |
| 10,488,284 | B2 * | 11/2019 | Jentoft | G01L 1/02 |
| 10,496,175 | B2 * | 12/2019 | Long | G06F 3/011 |
| 10,943,445 | B2 * | 3/2021 | Birnbaum | G06F 3/016 |
| 11,128,636 | B1 * | 9/2021 | Jorasch | H04W 12/08 |
| 11,358,284 | B2 * | 6/2022 | Adiletta | G09B 21/009 |
| 11,458,389 | B2 | 10/2022 | Nakagawa | |
| 11,478,925 | B2 * | 10/2022 | Lee | A61B 5/4884 |
| 11,568,718 | B2 | 1/2023 | Yokoyama | |
| 11,845,003 | B2 * | 12/2023 | Fukushima | A63F 13/428 |
| 12,047,196 | B2 * | 7/2024 | Woodman | H04L 12/40 |
| 12,282,710 | B2 * | 4/2025 | King | B25J 3/04 |
| 2009/0055019 | A1 * | 2/2009 | Stiehl | B25J 9/1671 |
| | | | | 901/17 |
| 2010/0093252 | A1 * | 4/2010 | Hu | B25J 13/02 |
| | | | | 446/327 |
| 2014/0035736 | A1 * | 2/2014 | Weddle | G05D 1/005 |
| | | | | 340/407.2 |
| 2015/0246654 | A1 * | 9/2015 | Tadic | G01P 15/02 |
| | | | | 340/436 |
| 2016/0098085 | A1 * | 4/2016 | Weddle | G06T 19/006 |
| | | | | 345/156 |
| 2017/0351331 | A1 * | 12/2017 | Weddle | G05D 1/005 |
| 2018/0144649 | A1 * | 5/2018 | El Kaliouby | G09B 5/06 |
| 2020/0070047 | A1 | 3/2020 | Nakagawa | |
| 2021/0260472 | A1 * | 8/2021 | Fukushima | A63F 13/53 |
| 2021/0390835 | A1 | 12/2021 | Yokoyama | |
| 2022/0004670 | A1 * | 1/2022 | King | B25J 9/104 |
| 2025/0050236 | A1 * | 2/2025 | Hirata | A63H 3/36 |

FOREIGN PATENT DOCUMENTS

| | | |
|---|---|---|
| JP | 2010089248 A | 4/2010 |
| JP | 2014174913 A | 9/2014 |
| JP | 6709006 B2 | 6/2020 |
| WO | 2018198229 A1 | 11/2018 |
| WO | 2020121661 A1 | 6/2020 |
| WO | 2020121662 A1 | 6/2020 |

OTHER PUBLICATIONS

International Search Report for corresponding PCT Application No. PCT/JP2021/044571, 4 pages, dated Feb. 1, 2024.
Office Action for corresponding JP Application JP2023-564721, Oct. 7, 2025, 10 pages.

* cited by examiner

F I G . 2

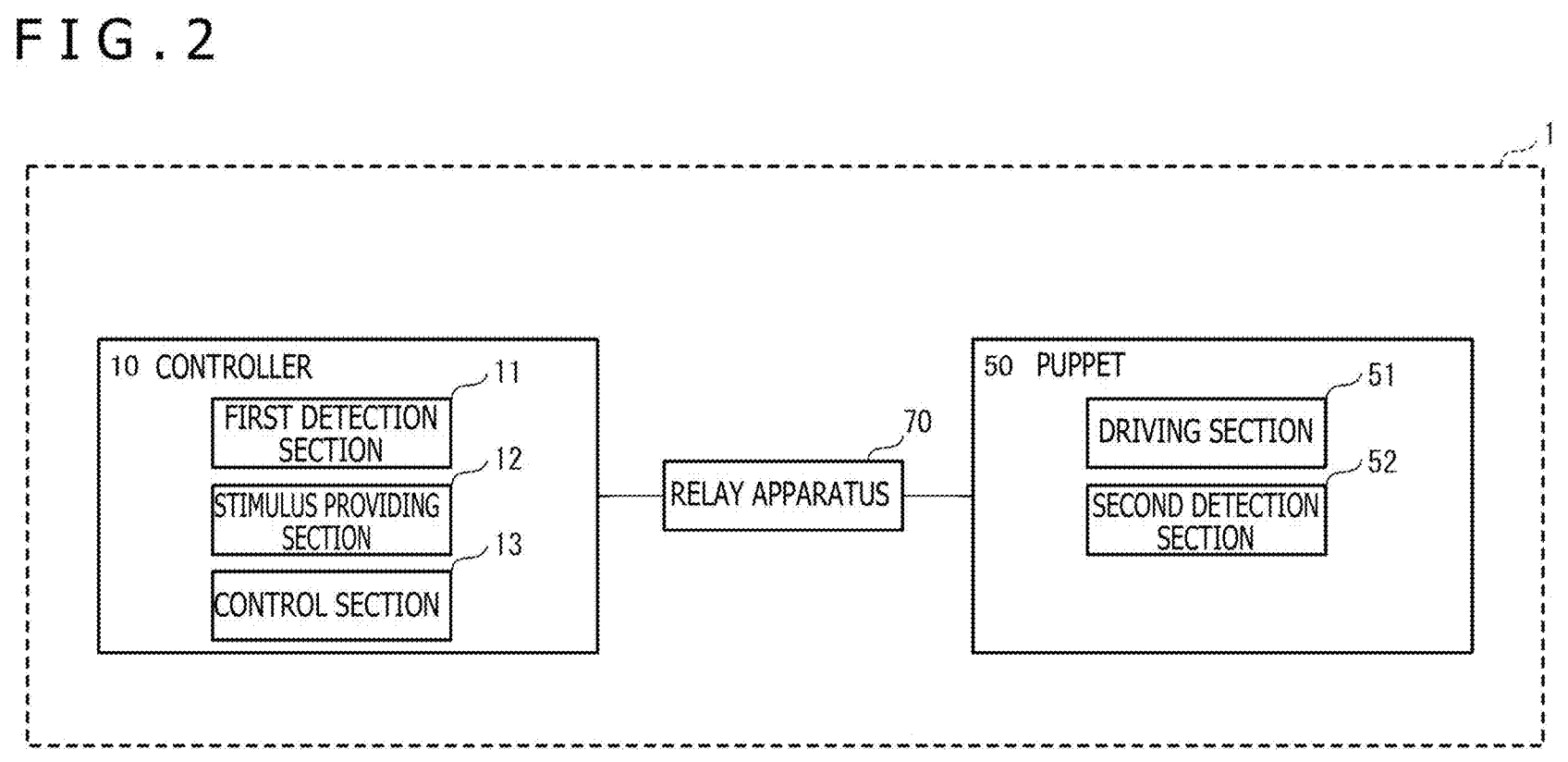

1

10 CONTROLLER

11 FIRST DETECTION SECTION

12 STIMULUS PROVIDING SECTION

13 CONTROL SECTION

70 RELAY APPARATUS

50 PUPPET

51 DRIVING SECTION

52 SECOND DETECTION SECTION

F I G . 4

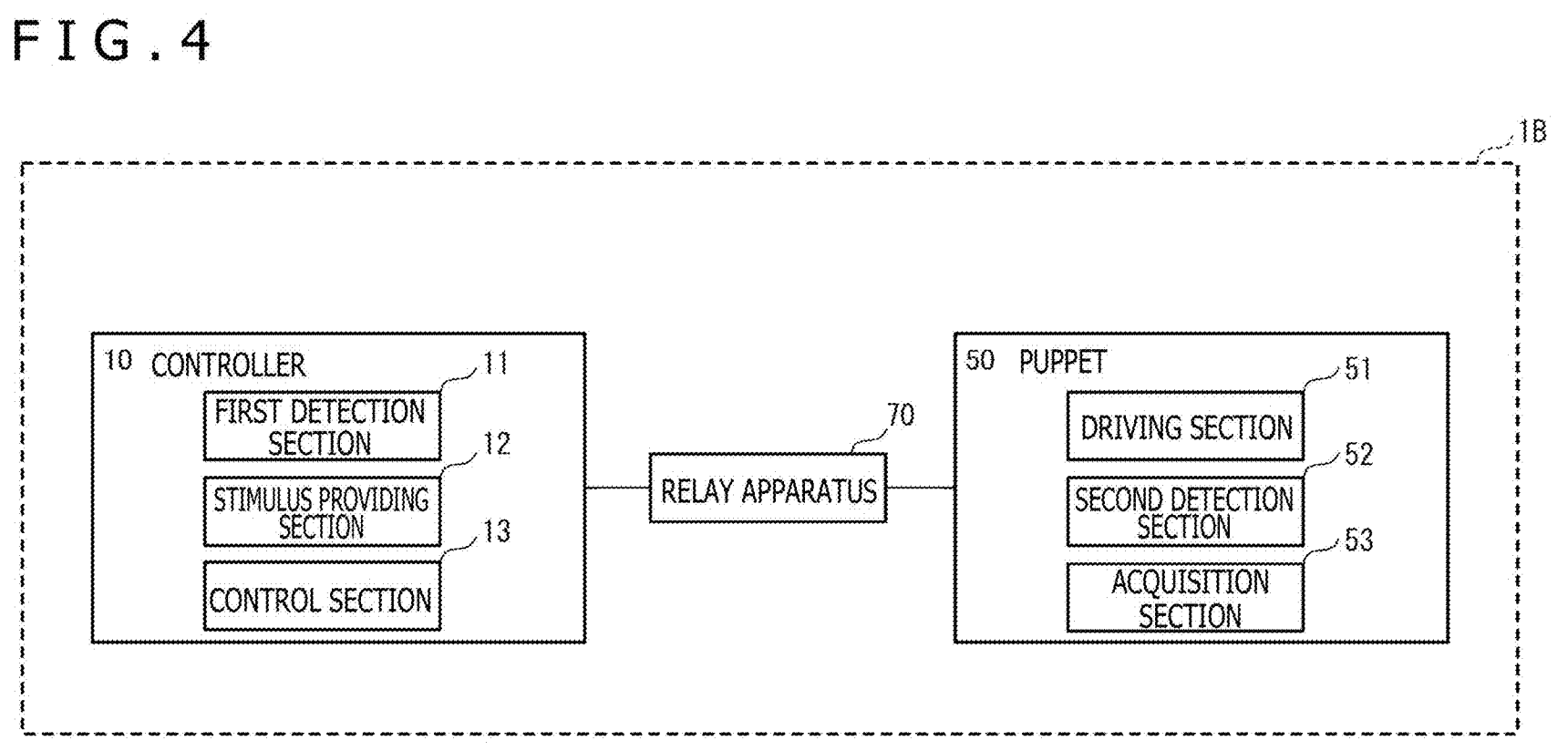

1B

10 CONTROLLER

11 FIRST DETECTION SECTION

12 STIMULUS PROVIDING SECTION

13 CONTROL SECTION

70 RELAY APPARATUS

50 PUPPET

51 DRIVING SECTION

52 SECOND DETECTION SECTION

53 ACQUISITION SECTION

Figure 8:
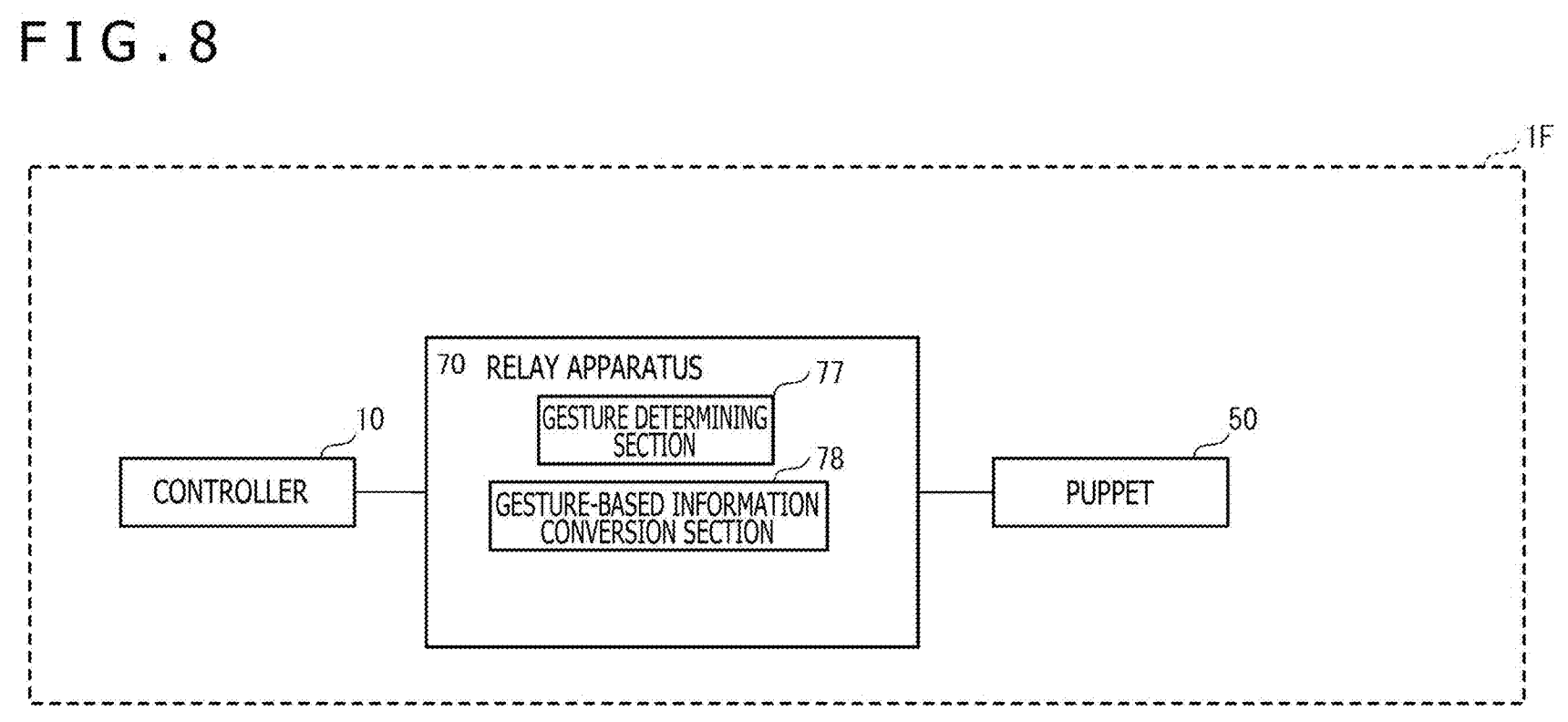

70 RELAY APPARATUS

77 GESTURE DETERMINING SECTION

78 GESTURE-BASED INFORMATION CONVERSION SECTION

50 PUPPET

10 CONTROLLER

COMMUNICATION SYSTEM FOR COMMUNICATION BETWEEN WEARABLE CONTROLLER AND REMOTE TARGET

TECHNICAL FIELD

The present invention relates to a communication system for remotely operating an operation target by a controller.

BACKGROUND ART

Various techniques for remote communication have hitherto been proposed. There have been many demands to bring remote communication closer to face-to-face communication including contents and expressions that are difficult to convey via sound and video. For example, application of a remote operation technique as described in PTL 1 is one possible option.

CITATION LIST

Patent Literature

[PTL 1] Japanese Patent Laid-Open No. 2010-89248

SUMMARY

Technical Problem

An automation control system described in PTL 1 replaces a known method in which a hand puppet is manually operated. However, a simple automation control system has difficulty in addressing demands to realize contents and expressions that are difficult to convey via sound and video.

The present disclosure is intended to solve at least some of the problems described above, and an object of the present disclosure is to provide a communication system enabling new remote communication to be experienced in which a user feels like being actually engaged in face-to-face communication.

Solution to Problem

A communication system according to the present disclosure includes a controller installed on a hand of a user, an operation target remotely operated by the controller, and a relay apparatus that performs relaying between the controller and the operation target. The controller includes a first detection section that detects a motion of fingers of the user, a stimulus providing section that provides an external stimulus to the fingers of the user, and a control section that controls the stimulus providing section. The operation target includes a driving section that operates in reference to action information received, and a second detection section that detects the external stimulus to the operation target. The relay apparatus transmits, to the operation target, the action information based on a detection result from the first detection section, and in reference to a detection result from the second detection section, transmits, to the controller, stimulus provision information for controlling the stimulus providing section to provide an external stimulus to the user.

BRIEF DESCRIPTION OF DRAWINGS

FIG. 2 is a functional block diagram illustrating the configuration of the communication system according to the embodiment.

FIG. 4 is a functional block diagram illustrating a configuration of a communication system according to a second variation of the embodiment.

FIG. 5 is a functional block diagram illustrating a configuration of a communication system according to a third variation of the embodiment.

FIG. 8 is a functional block diagram illustrating a configuration of a communication system according to a sixth variation of the embodiment.

DESCRIPTION OF EMBODIMENTS

An embodiment of the present disclosure will be described below in reference to the drawings.

[General Configuration of Communication System]

Figure 1:
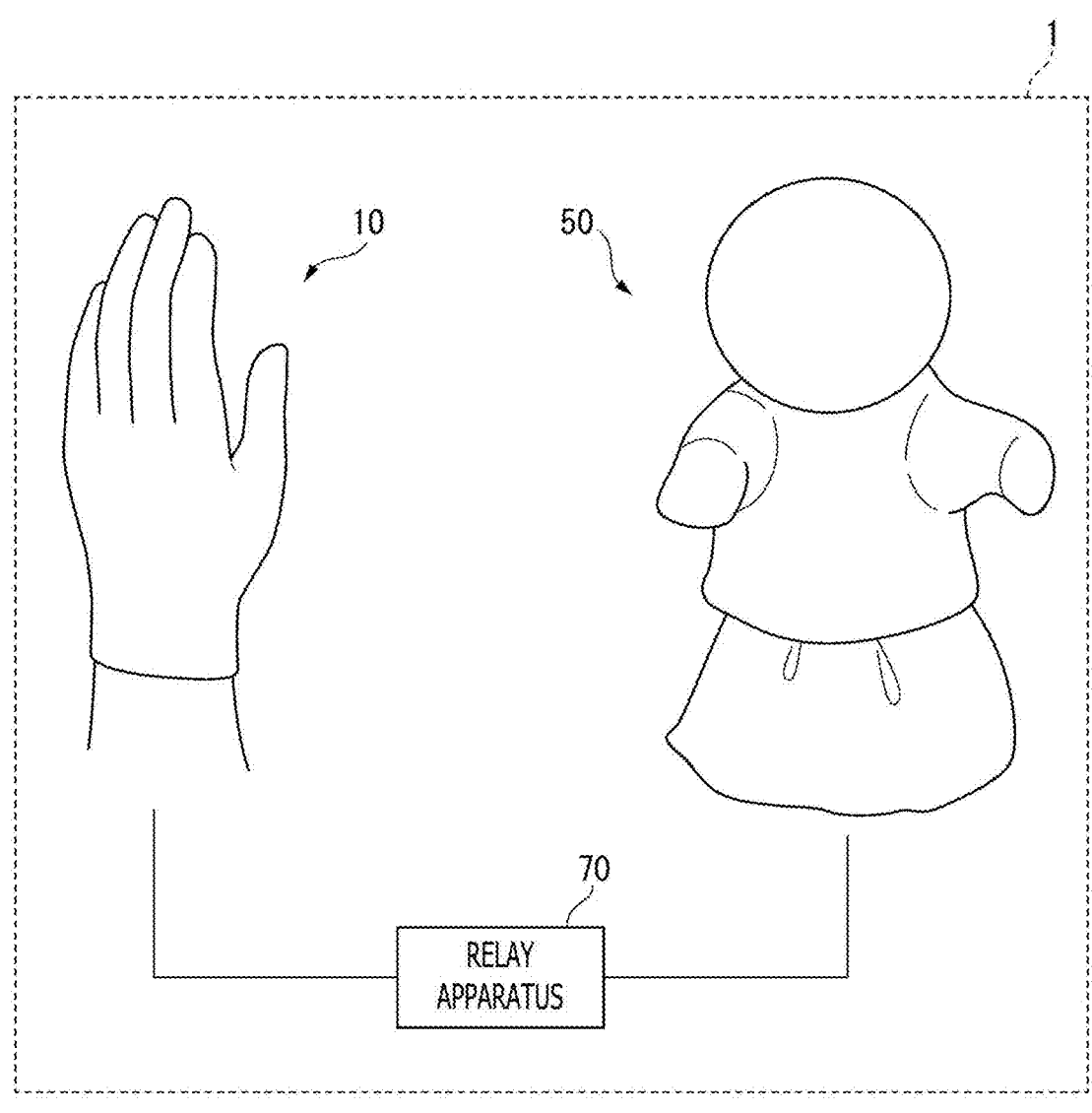
FIG. 1 is a schematic diagram illustrating a configuration of a communication system according to an embodiment.

FIG. 1 is a schematic diagram illustrating a configuration of a communication system 1 according to the present embodiment.

As illustrated in FIG. 1, the communication system 1 according to the present embodiment includes a controller 10 installed on the hand of a user, a puppet 50 as an operation target to be remotely operated by the controller 10, and a relay apparatus 70 that performs relaying between the controller 10 and the puppet 50.

Each component of the communication system 1 will be described below.

FIG. 2 is a functional block diagram illustrating a configuration of the communication system 1.

[Configuration of Controller]

As illustrated in FIG. 1, the controller 10 is an operation apparatus shaped like, for example, a glove and installed on the hand of the user to remotely operate the operation target.

As illustrated in FIG. 2, the controller 10 includes a first detection section 11, a stimulus providing section 12, and a control section 13.

The first detection section 11 includes various trackers and sensors to detect a motion of the fingers of the user with the controller 10 installed on the fingers. Any well-known trackers and sensors may be used. Further, the trackers and sensors are placed adjacently at appropriate positions on the fingers of the user when the controller 10 is installed on the fingers. Some of the trackers and sensors, for example, a generator required for detection by the trackers, and the like, may be provided separately from the controller 10.

The relay apparatus 70 transmits, to the puppet 50, action information based on a detection result from the first detection section 11. Here, the action information is information indicating a motion of the fingers of the user detected by the first detection section 11, and may be detected information itself or information based on the motion of the fingers of the user detected by the first detection section 11.

The stimulus providing section 12 includes various actuators and regulating sections to provide an external stimulus to the fingers of the user with the controller 10 installed on the fingers. The external stimulus includes a tactile sense, a haptic sense, a sense of pressure, a thermal sense, and the like. Any well-known actuators and regulating sections may be used. Further, the actuators and regulating sections are placed adjacently at appropriate positions on the fingers of the user when the controller 10 is installed on the fingers.

The control section 13 includes an arithmetic processing circuit such as a CPU (Central Processing Unit) or a GPU (Graphics Processing Unit) to control the stimulus providing section 12. In this case, the control section 13 controls the stimulus providing section 12 in reference to stimulus provision information that is received from the relay apparatus 70 and that originates from the puppet 50. The stimulus provision information will be described in detail.

Note that the controller 10 is not limited to having the configuration shaped like a glove as illustrated in FIG. 1, and may, for example, have an exoskeletal configuration, be configured as a combination of a glove and an exoskeleton, include a ring-shaped device with independent components for the respective fingers, a wrist band-shaped device, or the like, or have any other configuration. Further, power supply to the controller 10 may be configured as an external power source for the controller 10 or configured as a battery built in the controller 10.

[Configuration of Puppet]

As illustrated in FIG. 1, the puppet 50 includes, for example, a head section and a pair of arms and is an operation target to be remotely operated by the controller 10.

As illustrated in FIG. 2, the puppet 50 includes a driving section 51 and a second detection section 52.

The driving section 51 includes a plurality of motors such as servo motors and actuators according to the shape of the puppet 50 to drive at least one of a portion of the puppet 50 such as a head section or an arm section or the upper body, the lower body, the whole body, or the like of the puppet 50. In this case, the driving section 51 performs driving in reference to action information (for example, a control signal causing the servo motor to operate) that is received from the relay apparatus 70 and that originates from the controller 10.

The second detection section 52 includes various sensors to detect an external stimulus to the puppet 50. The external stimulus includes a tactile sense, a haptic sense, a sense of pressure, a thermal sense, and the like as described above. As the various sensors, any well-known sensors that can detect these external stimuli can be used. Further, the sensors are placed at appropriate positions on the puppet 50.

The relay apparatus 70 transmits, to the controller 10, stimulus provision information based on a detection result from the second detection section 52. Here, the stimulus provision information is information used to control the stimulus providing section 12 and provide an external stimulus to the user. The stimulus provision information may be information indicating the detection result itself of detection performed by the second detection section 52 or information based on the detection result from the second detection section 52. For example, the stimulus provision information may be raw data including outputs from the sensors provided in the second detection section 52, the outputs being subjected to no processing, or may be data including outputs from the sensors provided in the second detection section 52, the outputs being subjected to predetermined processing.

Note that the puppet 50 is not limited to having the configuration of being shaped like a doll illustrated in FIG. 1 and may have a configuration of being shaped like the hand of a human being. Further, for example, the puppet 50 does not necessarily need joints and may have, for example, a cushion-like configuration of being shaped like an inorganic object or the like including a built-in vibration actuator or mechanism enabling the weight of the puppet 50 to be shifted. In addition, power supply to the puppet 50 may be configured as an external power source for the puppet 50 or as a built-in battery in the puppet 50.

[Configuration of Relay Apparatus]

As illustrated in FIG. 1 and FIG. 2, the relay apparatus 70 is an apparatus that performs relaying between the controller 10 and the puppet 50. The relay apparatus 70 transmits, to the puppet 50 as the operation target, action information based on the detection result from the first detection section 11 of the controller 10. Further, the relay apparatus 70 transmits the stimulus provision information to the controller 10.

[Processing in Communication System]

In the communication system 1, when the user operates the controller 10 by moving fingers of the user with the controller 10 installed on the fingers, the first detection section 11 detects a motion of the fingers of the user. Then, when the relay apparatus 70 transmits, to the puppet 50, the action information based on the detection result from the first detection section 11, the driving section 51 of the puppet 50 operates in reference to the action information that is received from the relay apparatus 70 and that originates from the controller 10. In other words, operation of the controller 10 causes the driving section 51 of the puppet 50 to perform an action according to the motion of the fingers of the user, with the operation of the controller 10 reproduced on the puppet 50 side.

Meanwhile, when the puppet 50 receives an external stimulus, the second detection section 52 detects the external stimulus to the puppet 50. Then, when the relay apparatus 70 transmits, to the controller 10, stimulus provision information based on the detection result from the second detection section 52, the control section 13 of the controller 10 controls the stimulus providing section 12 in reference to the stimulus provision information that is received from the relay apparatus 70 and that originates from the puppet 50. In other words, when the puppet 50 receives an external stimulus, the control section 13 of the controller 10 controls the stimulus providing section 12, and the external stimulus received by the puppet 50 is reproduced on the controller 10 side.

The communication system 1 according to the present embodiment described above produces the following effects. The communication system 1 includes the controller 10 installed on the hand of the user, the puppet 50 as the operation target to be remotely operated by the controller 10, and the relay apparatus 70 that performs relaying between the controller 10 and the puppet 50. The controller 10 includes the first detection section 11 that detects a motion of the fingers of the user, the stimulus providing section 12 that provides an external stimulus to the fingers of the user, and the control section 13 that controls the stimulus providing section 12. The puppet 50 includes the driving section 51 that operates in reference to action information received, and the second detection section 52 that detects an external stimulus to the puppet 50. The relay apparatus 70 transmits, to the puppet 50, action information based on the detection result from the first detection section, and in reference to the detection result from the second detection section 52, transmits, to the controller 10, the stimulus provision information for controlling the stimulus providing section 12 to provide an external stimulus to the user.

According to such a configuration, information is bidirectionally transmitted between the controller 10 and the puppet 50 as the operation target not only to allow the puppet 50 as the operation target to be remotely operated by the controller 10 but also to allow the external stimulus to the puppet 50 as the operation target to be fed back to the controller 10. This enables intuitive and easy conveyance, in remote operation, of contents and expressions that are difficult to convey via sound and video, for example, hardness or softness of an object, the temperature of the object, and the like. Thus, for the user, the configuration allows intuitive conveyance, with realistic sensations, of sensibility information with feelings and emotions such as joy and comfortableness felt by the user when the user is actually in face-to-face communication, enabling the user to experience new remote communication.

First Variation of Embodiment

Figure 3:
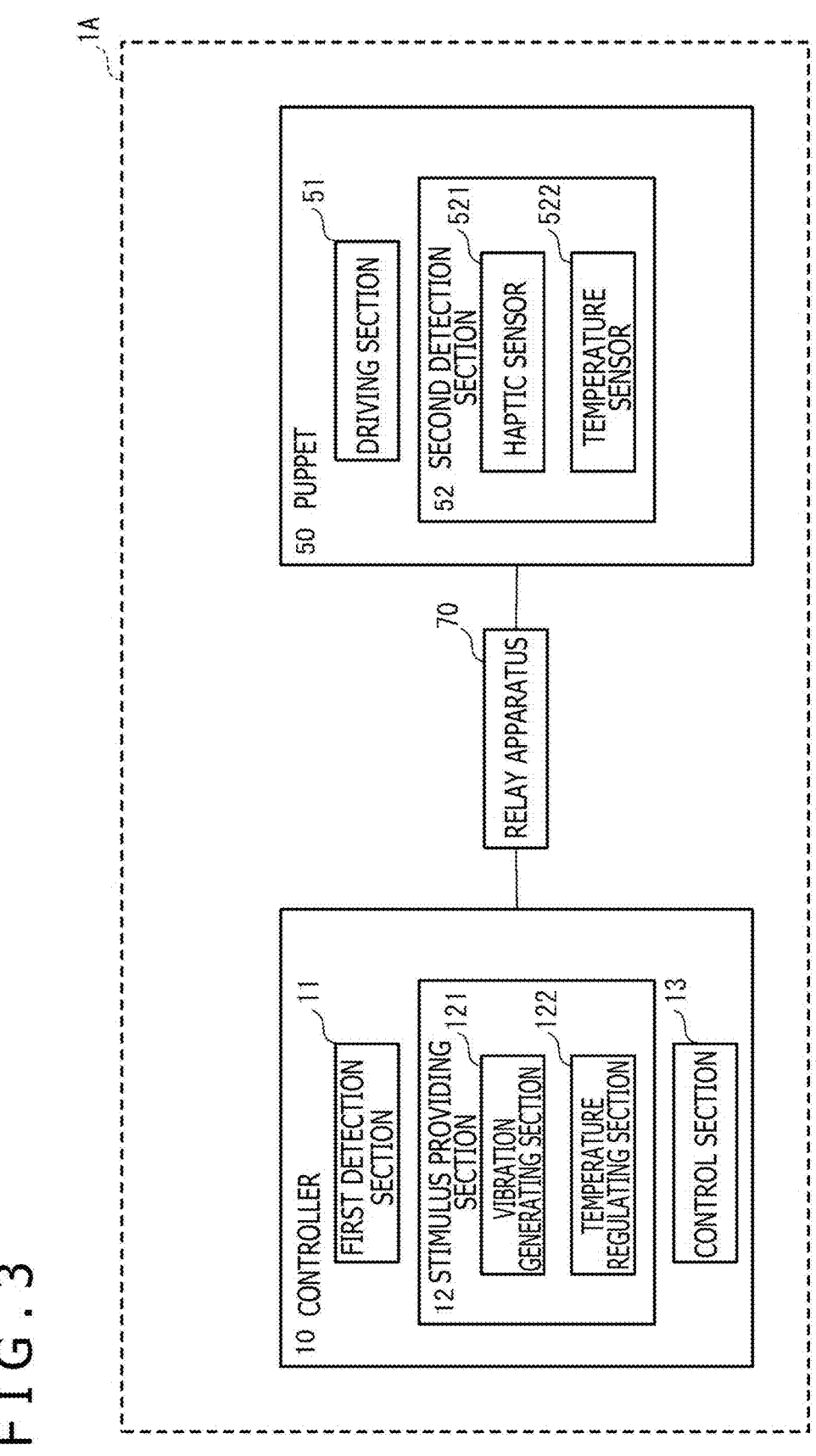
FIG. 3 is a functional block diagram illustrating a configuration of a communication system according to a first variation of the embodiment.

FIG. 3 is a functional block diagram illustrating a configuration of a communication system 1A according to a first variation. The communication system 1A is configured in a manner similar to that of the communication system 1 according to the embodiment described above except for the configuration of the controller 10 and the puppet 50. Note that, in the description below, the same or substantially the same components as those already described are denoted by the same reference signs and description of these components is omitted.

[Configuration of Communication System]

In the controller 10 of the communication system 1A, the stimulus providing section 12 includes a vibration generating section 121 and a temperature regulating section 122 as illustrated in FIG. 3.

The vibration generating section 121 includes a vibrator such as a motor to generate vibration under the control of the control section 13. When the vibration generating section 121 vibrates, an external stimulus such as a haptic sense is provided to the fingers of the user with the controller 10 installed on the fingers. The vibration generating section 121 is placed adjacently at an appropriate position on the fingers of the user when the controller 10 is installed.

The temperature regulating section 122 includes a member that can regulate temperature and regulates temperature under the control of the control section 13. When the temperature regulating section 122 regulates temperature, external stimuli such as a sense of warmth and a sense of cold are provided to the fingers of the user with the controller 10 installed on the fingers. The temperature regulating section 122 is placed adjacently at an appropriate position on the fingers of the user when the controller 10 is installed.

In the puppet 50 of the communication system 1A, the second detection section 52 includes a haptic sensor 521 and a temperature sensor 522 as illustrated in FIG. 3.

The haptic sensor 521 detects external stimuli such as a tactile sense, a haptic sense, and a sense of pressure among the external stimuli provided to the puppet 50. The haptic sensor 521 is placed at an appropriate position on the puppet 50. The relay apparatus 70 transmits, to the controller 10, stimulus provision information based on a detection result from the haptic sensor 521.

The temperature sensor 522 detects external stimuli such as a sense of warmth and a sense of cold among the external stimuli provided to the puppet 50. The temperature sensor 522 is placed at an appropriate position on the puppet 50. The relay apparatus 70 transmits the stimulus provision information based on a detection result from the temperature sensor 522.

[Processing in Communication System]

When the puppet 50 receives any of the external stimuli such as the haptic sense and the sense of pressure, the haptic sensor 521 of the second detection section 52 detects the external stimulus to the puppet 50. Then, when the relay apparatus 70 transmits, to the controller 10, the stimulus provision information based on the detection result from the second detection section 52, the control section 13 of the controller 10 causes the vibration generating section 121 of the stimulus providing section 12 to perform an action, in reference to stimulus provision information that is received from the relay apparatus 70 and that originates from the puppet 50. In other words, when the puppet 50 receives any of the external stimuli such as a tactile sense, a haptic sense, and a sense of pressure, the control section 13 of the controller 10 causes the vibration generating section 121 of the stimulus providing section 12 to perform an action according to the external stimulus, and the controller 10 side reproduces any of the external stimuli such as the tactile sense, the haptic sense, and the sense of pressure which has been received by the puppet 50.

Further, when the puppet 50 receives any of the external stimuli such as the sense of warmth and the sense of cold, the temperature sensor 522 of the second detection section 52 detects the external stimulus to the puppet 50. Then, when the relay apparatus 70 transmits, to the controller 10, the stimulus provision information based on the detection result from the second detection section 52, the control section 13 of the controller 10 causes the temperature regulating section 122 of the stimulus providing section 12 to perform an action, in reference to stimulus provision information that is received from the relay apparatus 70 and that originates from the puppet 50. In other words, when the puppet 50 receives any of the external stimuli such as the sense of warmth and the sense of cold, the control section 13 of the controller 10 causes the temperature regulating section 122 of the stimulus providing section 12 to perform an action according to the external stimulus, and the controller 10 side reproduces any of the external stimuli such as the sense of warmth and the sense of cold which has been received by the puppet 50.

In the communication system 1A according to the first variation of the present embodiment described above, the second detection section 52 of the puppet 50 includes the haptic sensor 521, and the relay apparatus 70 transmits, to the controller 10, the stimulus provision information based on the detection result from the haptic sensor 521. The stimulus providing section 12 of the controller 10 includes the vibration generating section 121, and the control section 13 causes the vibration generating section 121 to perform an action in reference to the stimulus provision information.

Such a configuration allows feedback, to the controller 10, and reproduction of the external stimuli such as the tactile sense, the haptic sense, and the sense of pressure which are provided to the puppet 50 as the operation target. This allows reproduction of gestures and human contacts that are closer to those in face-to-face communication. Note that the vibration generating section 121 may be omitted and that a force generating section, a pressure generating section, and the like may be provided in addition to or instead of the vibration generating section 121.

Further, in the communication system 1A, the second detection section 52 of the puppet 50 includes the temperature sensor 522, and the relay apparatus 70 transmits, to the controller 10, the stimulus provision information based on the detection result from the temperature sensor 522. The stimulus providing section 12 of the controller 10 includes the temperature regulating section 122, and the control section 13 causes the temperature regulating section 122 to perform an action, in reference to the stimulus provision information.

Such a configuration allows feedback, to the controller 10, and reproduction of the external stimuli such as the sense of warmth and the sense of cold which are provided to the puppet 50 as the operation target. This allows reproduction of thermal sensation such as warmth that is closer to that in face-to-face communication. Note that the temperature regulating section 122 may be omitted.

Note that the haptic sensor 521 and the temperature sensor 522 illustrated in the first variation are examples of a sensor that detects an external stimulus to the puppet 50 as the operation target and that the present disclosure is not limited to these examples. The second detection section 52 may include a tactile touch pressure sensor detecting that the puppet 50 is touched on the arm, head, back, or the like, in other words, detecting touch on the arm, head, back, or the like of the puppet 50, an external-force detection sensor based on a joint angle sensor, a temperature sensor that detects a non-contact site by temperature (body temperature), a temperature sensor for monitoring room temperature, and the like. All of these sensors are placed at appropriate positions on the puppet 50.

Second Variation of Embodiment

FIG. 4 is a functional block diagram illustrating a configuration of a communication system 1B according to a second variation. The communication system 1B is configured in a manner similar to that of the communication system 1 according to the embodiment described above except for the configuration of the puppet 50. Note that, in the description below, the same or substantially the same components as those already described are denoted by the same reference signs and description of these components is omitted.

[Configuration of Communication System]

As illustrated in FIG. 4, the puppet 50 of the communication system 1B includes an acquisition section 53 in addition to the driving section 51 and the second detection section 52. The acquisition section 53 acquires one of a set of imaging information concerning surroundings of the puppet 50 as the operation target and a set of sound information concerning the surroundings of the puppet 50. The acquisition section 53 is placed at an appropriate position on the puppet 50. The relay apparatus 70 transmits, to the controller 10, at least one set of information acquired by the acquisition section 53.

[Processing in Communication System]

When the acquisition section 53 of the puppet 50 acquires at least one of the set of imaging information and the set of sound information, the relay apparatus 70 transmits the set of information to the controller 10. The controller 10 uses such information for various applications. For example, when still images and moving images based on the imaging information are displayed on the controller 10 main boy or a display apparatus provided separately from the controller 10, remote communication can be provided with improved realistic sensation as felt in face-to-face communication. Likewise, for example, when the sound information is output from the controller 10 main boy or a sound output apparatus provided separately from the controller 10, remote communication can be provided with improved realistic sensation as felt in face-to-face communication.

Further, the imaging information and the sound information may be utilized for control in the controller 10. For example, in a case where the imaging information and the sound information are used as the stimulus provision information, the situation of the surroundings of the puppet 50 as the operation target can be deduced and reflected in the control of the stimulus providing section 12 in reference to the imaging information and the sound information. As an example, variation in volume or the like in the sound information can be analyzed, and an increased volume can be assumed to indicate a lively condition or a bustling situation around the puppet 50, and by significantly varying the haptic sense in the vibration generating section 121 described in the first variation or significantly varying the sense of warmth in the temperature regulating section 122 described in the first variation, the external stimulus based on the situation of the surroundings of the puppet 50 as the operation target can be reproduced by the controller 10.

With the communication system 1B according to the second variation of the present embodiment described above, the imaging information and the sound information concerning the surroundings of the puppet 50 as the operation target can be fed back to the controller 10, improving the quality of the remote communication. Further, by using as the stimulus provision information of at least one of the set of imaging information and the set of sound information, enhancement of the remote communication is enabled in addition to realization of contents and expressions that are difficult to convey via sound and video.

Third Variation of Embodiment

Figure 5:
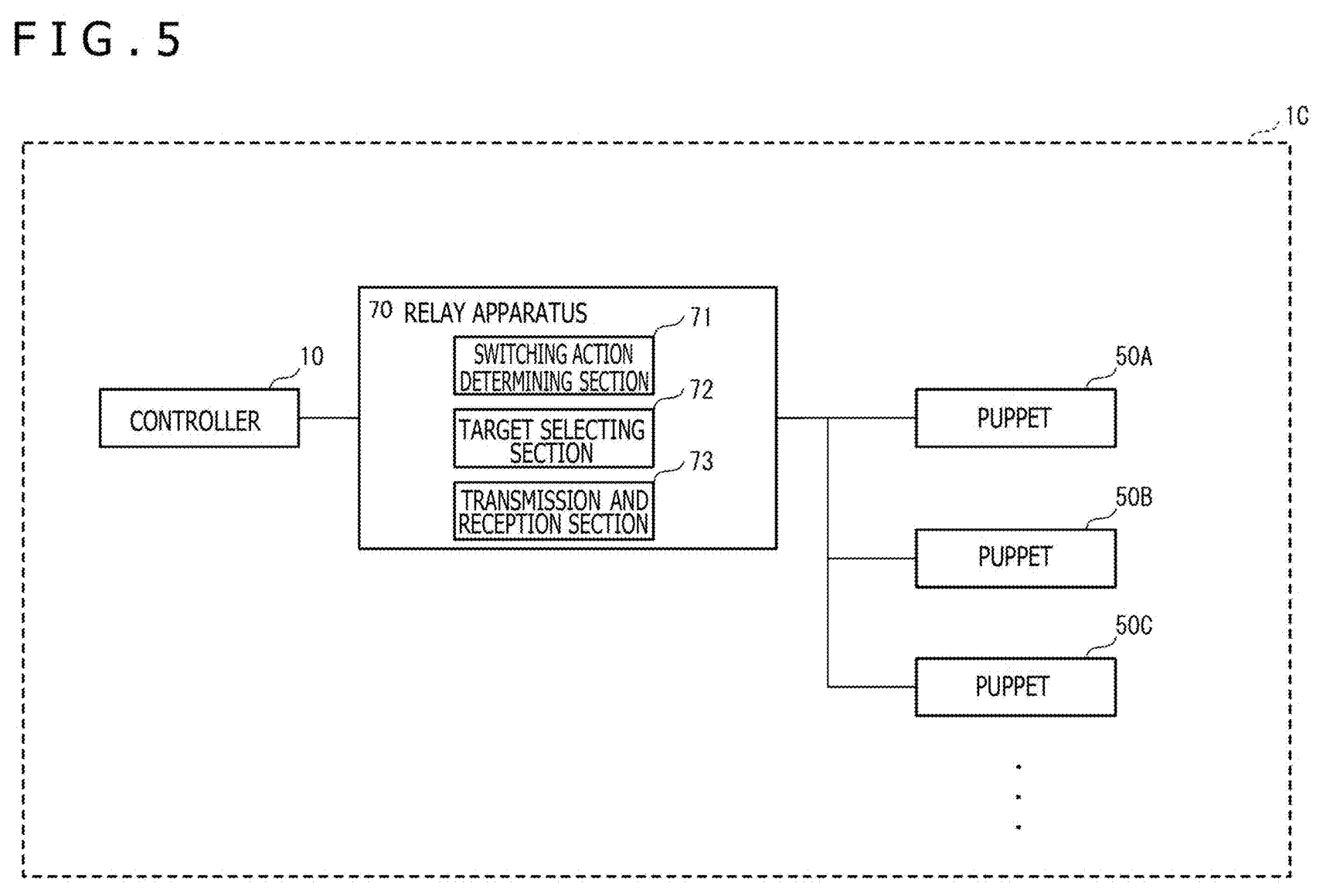

FIG. 5 is a functional block diagram illustrating a configuration of a communication system 1C according to a third variation. The communication system 1C is configured in a manner similar to that of the communication system 1 according to the embodiment described above except for provision of a plurality of operation targets and the configuration of the relay apparatus 70. Note that, in the description below, the same or substantially the same components as those already described are denoted by the same reference signs and description of these components is omitted.

[Configuration of Communication System]

As illustrated in FIG. 5, the communication system 1C includes a plurality of puppets 50A, 50B, 50C . . . . Further, as illustrated in FIG. 5, the relay apparatus 70 includes a switching action determining section 71, a target selecting section 72, and a transmission and reception section 73. The switching action determining section 71 determines whether an action of the fingers detected by the first detection section 11 is a communication target switching action. The communication target switching action is a preset pose or gesture and is an action for selecting or switching the puppet to communicate with from among the plurality of puppets 50A, 50B, 50C, . . . . For example, in a case where the puppet 50A is set in a pose of holding up one finger, the puppet 50B is set in a pose of holding up two fingers, and the puppet 50C is set in a pose of holding up three fingers, and the action of the fingers detected by the first detection section 11 is one of the poses, the switching action determining section 71 can determine the action to be the communication target switching action. Note that one or more operation targets may be set in association with one communication target switching action. Further, the communication target switching action may be a motionless pose or a series of poses with a motion such as hand waving.

When the switching action determining section 71 determines the action of the fingers to be the communication target switching action, the target selecting section 72 selects, as the communication target, an operation target corresponding to the communication target switching action from among the plurality of puppets 50A, 50B, 50C, . . . which are the operation targets. The transmission and reception section 73 transmits the action information to the communication target selected by the target selecting section 72, and receives the stimulus provision information from the communication target.

[Processing in Communication System]

When the switching action determining section 71 determines the action of the fingers detected by the first detection section 11 to be the communication target switching action, the target selecting section 72 selects, from among the plurality of puppets 50A, 50B, 50C . . . , which are the operation targets, an operation target corresponding to the communication target switching action, as a communication target. The transmission and reception section 73 transmits the action information to the communication target selected by the target selecting section 72, and receives the stimulus provision information from the communication target.

With the communication system 1C according to the third variation of the present embodiment described above, simply performing the preset communication target switching action enables the user to select, as a communication target, one of the plurality of puppets 50A, 50B, 50C, . . . included in the communication system 1C, and switch to the communication target.

Note that the plurality of puppets 50A, 50B, 50C, . . . included in the communication system 1 may have the same configuration or partly or totally different configurations.

Fourth Variation of Embodiment

Figure 6:
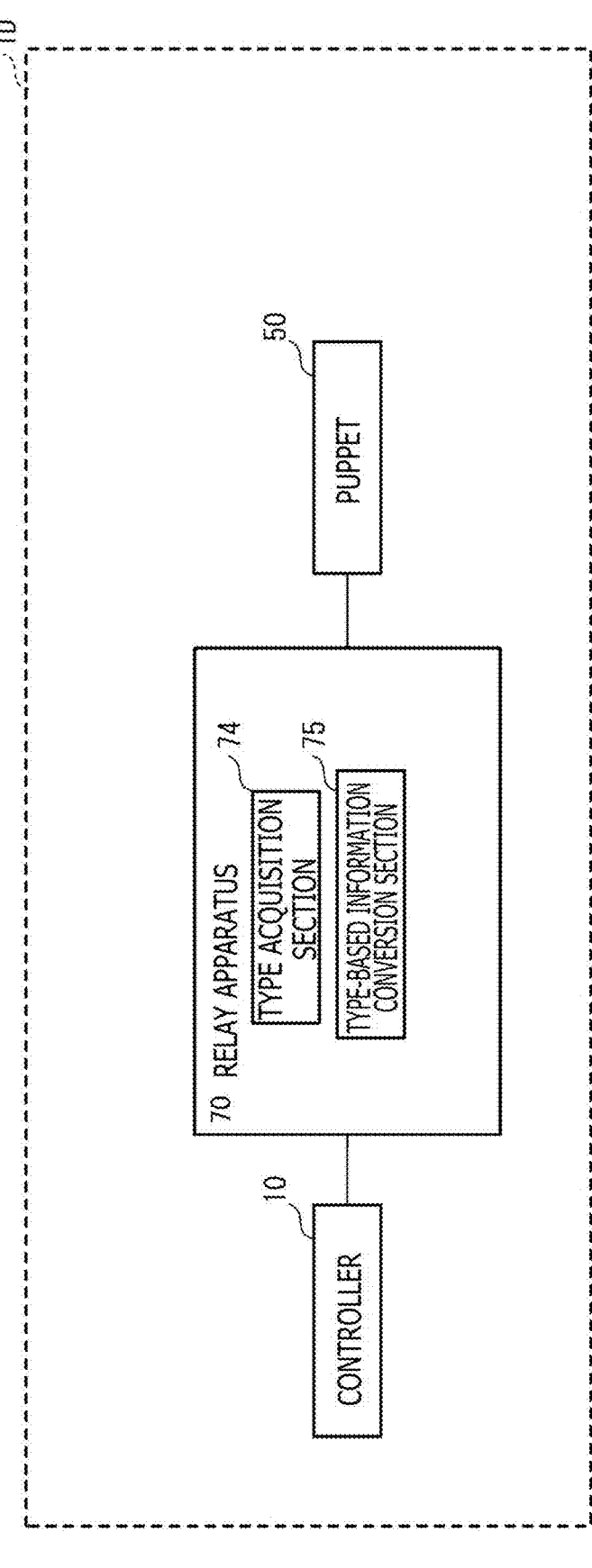
FIG. 6 is a functional block diagram illustrating a configuration of a communication system according to a fourth variation of the embodiment.

FIG. 6 is a functional block diagram illustrating a configuration of a communication system 1D according to a fourth variation. The communication system 1D is configured in a manner similar to that of the communication system 1 according to the embodiment described above except for the configuration of the relay apparatus 70. Note that, in the description below, the same or substantially the same components as those already described are denoted by the same reference signs and description of these components is omitted.

[Configuration of Communication System]

In the communication system 1D, the relay apparatus 70 includes a type acquisition section 74 and a type-based information conversion section 75 as illustrated in FIG. 6.

The type acquisition section 74 acquires type-based information indicating the type of the operation target. The type of the operation target is information indicating what apparatus configuration the operation target of the controller 10 has.

The type-based information conversion section 75 converts the action information in reference to type information acquired by the type acquisition section 74. As described above, the action information is information indicating the action of the fingers of the user detected by the first detection section 11 of the controller 10. Possible types of such action information include, for example, the following.

(1) Action Information a Detected by the First Detection Section 11 of the Controller 10.

Action information A refers to, for example, outputs themselves from various trackers and sensors provided in the first detection section 11, or coordinate information regarding such features as joints in the fingers of the user which is calculated according to the outputs, motion data regarding the features, and the like.

The action information A requires no knowledge of what motor and actuator configurations the operation target has and does not depend on the configuration of the operation target side. Further, the action information A has a relatively large amount of information and is useful for improving reproducibility, whereas the action information A includes a large amount of data used during transmission.

(2) Action Information B Obtained by Interpreting Time Series Data of the Action Information a to Apply and Convert the Time Series Data into Predetermined Action The action information B is data obtained by, for example, interpreting the time series data of the action information A to convert the time series data into a predefined predetermined pose or gesture as is the case with the communication target switching action described in the third variation.

The action information B requires knowing to some degree what motor and actuator configurations the operation target has, in order to interpret the time series data. Accordingly, the action information B depends on the configuration of the operation target side to some degree. Further, the action information B is temporarily encoded by interpretation of the time series data, and thus has a relatively small amount of information and a relatively small amount of data used during transmission, while being inferior to the action information A in reproducibility.

(3) Action Information C Obtained by Converting Action Information a or Action Information B into Time Series Control Data for the Configuration of the Operation Target Side Action information C requires the configuration of the motors and actuators in the operation target to be known, in order to generate time series control data for the motors and actuators in the operation target. Accordingly, the action information C depends on the configuration of the operation target side. Further, typically, a period requiring control data for the motors and actuators in the operation target is longer than a detection period in the first detection section 11, and thus the action information C has a smaller amount of information and a smaller amount of data used during transmission than the action information A.

In reference to the type information acquired by the type acquisition section 74, the type-based information conversion section 75 selects preferred action information from the action information A to the action information C and converts the selected action information as necessary. The type-based information conversion section 75 is configured to consider, in selecting the preferred action information, at least one of the dependence on the configuration of the operation target side, the necessity of the amount of information, desired reproducibility, and the amount of data used during transmission. Further, the user may be able to set the conversion to be performed according to the type information acquired by the type acquisition section 74. In addition, what kind of action information is to be selected in a case where the type acquisition section 74 fails to acquire the type information may be preset. Further, besides the action information A to the action information C described above, action information with a different conversion content may be an option. In addition, the type-based information conversion section 75 may select a plurality of types of action information.

[Processing in Communication System] When the type acquisition section 74 acquires the type-based information indicating the type of the operation target, the type-based information conversion section 75 selects the action information in reference to the type information, and converts the action information as necessary. Then, in a case where the action information is converted, the converted action information is transmitted to the operation target.

With the communication system 1D according to the fourth variation of the present embodiment described above, the controller 10 transmits the preferred action information depending on the type of the operation target.

Figure 7:
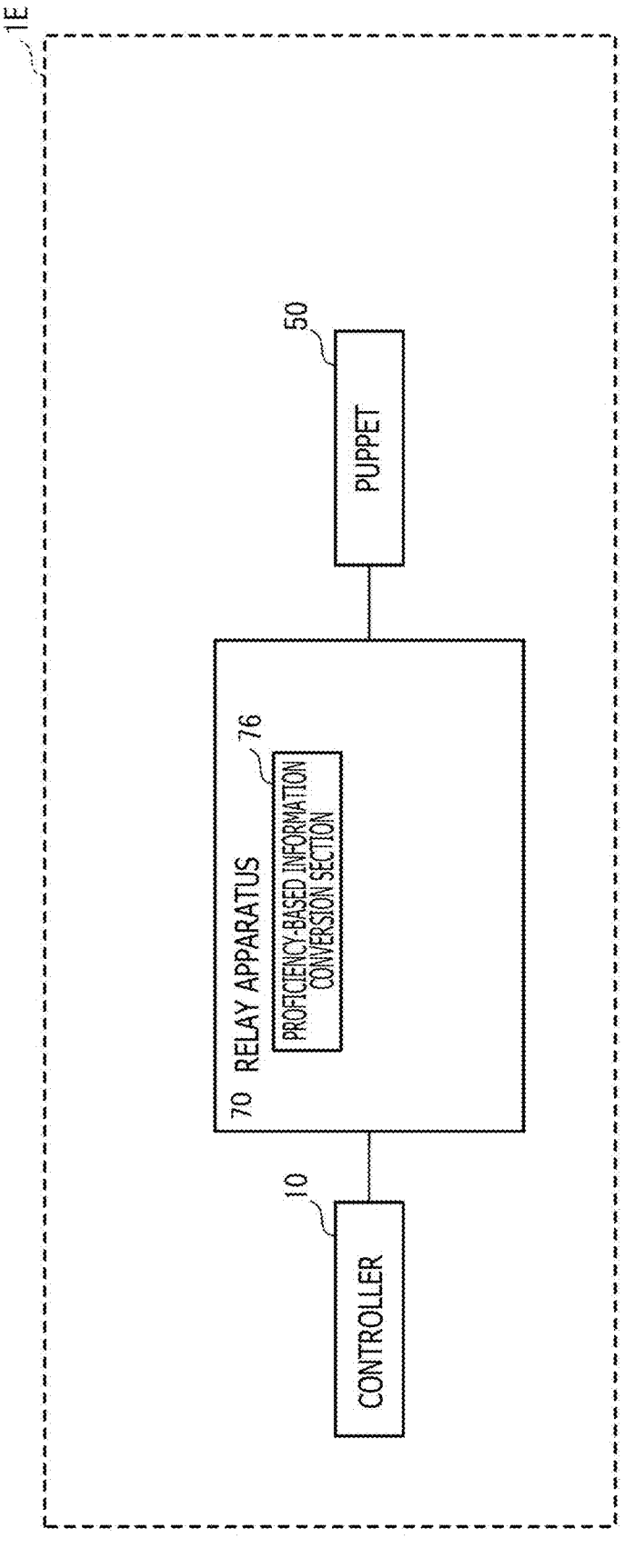
FIG. 7 is a functional block diagram illustrating a configuration of a communication system according to a fifth variation of the embodiment.

[Fifth Variation of Embodiment] FIG. 7 is a functional block diagram illustrating a configuration of a communication system 1E according to a fifth variation.

The communication system 1E is configured in a manner similar to that of the communication system 1 according to the embodiment described above except for the configuration of the relay apparatus 70. Note that, in the description below, the same or substantially the same components as those already described are denoted by the same reference signs and description of these components is omitted.

[Configuration of Communication System] In the communication system 1E, the relay apparatus 70 includes a proficiency-based information conversion section 76 as illustrated in FIG. 7.

The proficiency-based information conversion section 76 converts the action information according to the usage proficiency of the user. The action information is similar to the action information A to the action information C in the fourth variation described above. The proficiency-based information conversion section 76 analyzes information indicating the motion of the fingers of the user detected by the first detection section 11, to determine the level of proficiency of the user operating the controller 10. Such analysis can be performed by a method such as well-known rule-based analysis or deep learning.

For example, in a case where the user has a high level of proficiency, in other words, in a case where the user can be determined to be an expert, the proficiency-based information conversion section 76 selects information itself indicating the motion of the fingers of the user detected by the first detection section 11, for example, the action information A described above.

On the other hand, in a case where the user has a low level of proficiency, in other words, the user can be determined to be a beginner or to be unfamiliar with operation, the proficiency-based information conversion section 76 converts the action information from a predefined predetermined pose or gesture into a pose or gesture that can be assumed to correspond to the motion of the fingers of the user detected by the first detection section 11. Such assumption can be performed in a manner similar to that of the determination by the switching action determining section 71 described in the third variation.

Further, in a case where the user has a low level of proficiency, the proficiency-based information conversion section 76 may perform various conversions for assisting the user with a low level of proficiency, for example, a conversion for smoothing the motion, a conversion for adding a nuance of the motion such as loveliness or familiarity, and a conversion for making a well-modulated motion. Further, the user may be able to set the conversion to perform in a case where the user has a low level of proficiency. Furthermore, the user may be able to set the level of proficiency itself.

Further, presetting may be made as to what action information to select in a case where the proficiency-based information conversion section 76 fails to determine the level of proficiency. In addition, besides the action information A to the action information C described above, action information with a different conversion content may be an option. Further, the proficiency-based information conversion section 76 may select a plurality of types of action information.

[Processing in Communication System] The proficiency-based information conversion section 76 selects action information in reference to the level of proficiency of the user, and converts the action information as necessary. Further, in a case where the action information is converted, the converted action information is transmitted to the operation target.

With the communication system 1E according to the fifth variation of the present embodiment described above, the controller 10 transmits the preferred action information according to the level of proficiency of the user in the communication system 1E.

[Sixth Variation of Embodiment] FIG. 8 is a functional block diagram illustrating a configuration of a communication system 1F according to a sixth variation.

The communication system 1F is configured in a manner similar to that of the communication system 1 according to the embodiment described above except for the configuration of the relay apparatus 70. Note that, in the description below, the same or substantially the same components as those already described are denoted by the same reference signs and description of these components is omitted.

[Configuration of Communication System] In the communication system 1F, the relay apparatus 70 includes a gesture determining section 77 and a gesture-based information conversion section 78 as illustrated in FIG. 8.

The gesture determining section 77 determines whether or not the motion of the fingers detected by the first detection section 11 is a gesture causing the puppet 50 as the operation target to perform a predetermined action. The gesture causing the predetermined action to be performed is a preset gesture and is an action causing a predetermined action set in association with each gesture to be performed, as is the case with the communication target switching action described in the third variation. For example, in a case where a pose of holding up one finger is associated with an action of clapping hands, a pose of holding up two fingers is associated with an action of bowing, and a pose of holding up three fingers is associated with an action of waving the hand, and the action of the fingers detected by the first detection section 11 is one of the gestures, the gesture determining section 77 determines the action to be a gesture causing a predetermined action to be performed.

Note that, when both the gesture causing a predetermined action to be performed and the communication target switching action described in the third variation are to be set, different poses and gestures are preferably set in order to prevent confusions.

When the gesture determining section 77 determines the action to be a gesture causing a predetermined action to be performed, the gesture-based information conversion section 78 converts the action information corresponding to the motion of the fingers into action information causing a predetermined action set in association with a gesture to be performed.

[Processing in Communication System] When the gesture determining section 77 determines the motion of the fingers detected by the first detection section 11 to be a gesture causing the puppet 50 as the operation target to perform a predetermined action, the gesture-based information conversion section 78 converts the action information corresponding to the motion of the fingers into action information causing the puppet 50 as the operation target to perform a predetermined action. Then, in a case where the action information is converted, the converted action information is transmitted to the puppet 50.

With the communication system 1F according to the sixth variation of the present embodiment described above, simply performing a preset gesture enables the user to transmit, in the communication system 1F, the action information causing the puppet 50 as the operation target to perform a predetermined action set in association with each gesture. Accordingly, setting frequently performed actions or characteristic actions in association with gestures makes it possible to execute remote communication more easily.

Figure 9:
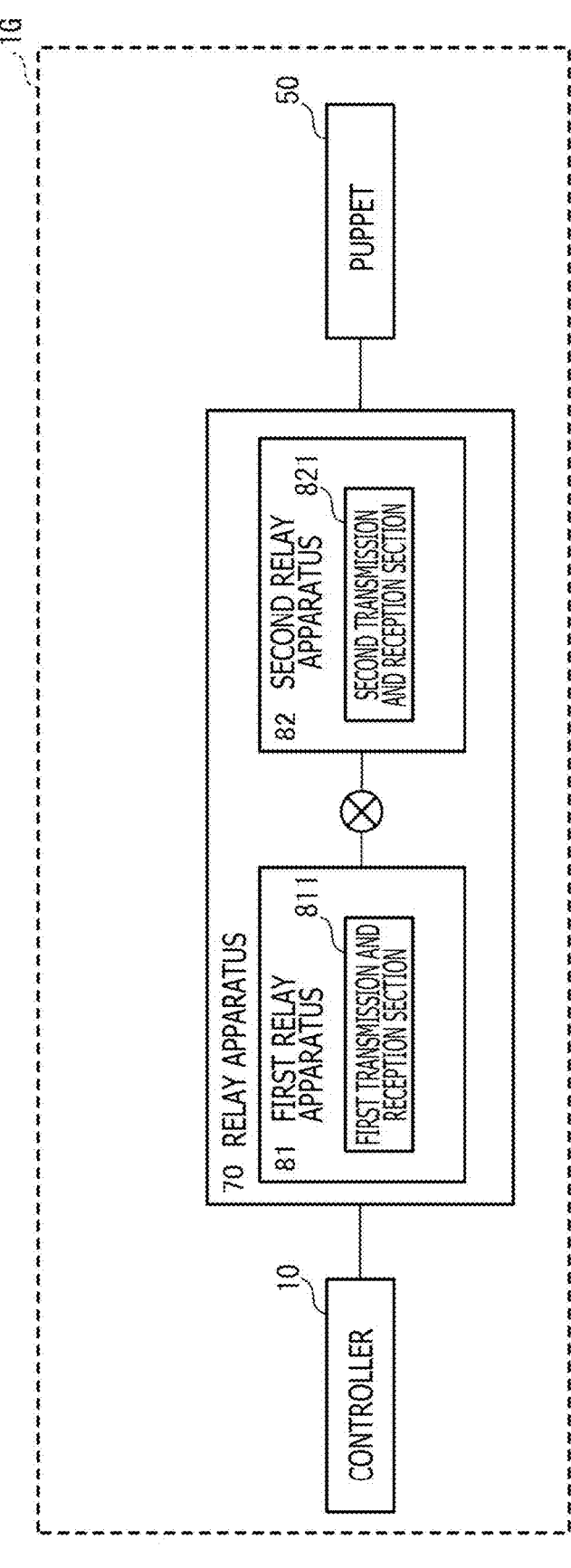
FIG. 9 is a functional block diagram illustrating a configuration of a communication system according to a seventh variation of the embodiment.

[Seventh Variation of Embodiment] FIG. 9 is a functional block diagram illustrating a configuration of a communication system 1G according to a seventh variation.

The communication system 1G is configured in a manner similar to that of the communication system 1 according to the embodiment described above except for the configuration of the relay apparatus 70. Note that, in the description below, the same or substantially the same components as those already described are denoted by the same reference signs and description of these components is omitted.

[Configuration of Communication System] In the communication system 1G, the relay apparatus 70 includes a first relay apparatus 81 and a second relay apparatus 82 as illustrated in FIG. 9.

The first relay apparatus 81 includes a first transmission and reception section 811 to communicate with the controller 10. The first relay apparatus 81 is a controller 10-side relay apparatus, and may be configured such that the controller 10 includes some or all of the functions of the first relay apparatus 81. Alternatively, the first relay apparatus 81 may include some or all of the functions of the controller 10.

The second relay apparatus 82 includes a second transmission and reception section 821 to communicate with the puppet 50 as the operation target and with the first relay apparatus 81 via the network. The second relay apparatus 82 is a puppet 50-side relay apparatus, and may be configured such that the puppet 50 includes some or all of the functions of the second relay apparatus 82. Alternatively, the second relay apparatus 82 may include some or all of the functions of the puppet 50.

Note that, in a case where the driving section 51 of the puppet 50 includes a servo motor, the first transmission and reception section 811 of the first relay apparatus 81 generates, according to the motion of the fingers detected by the first detection section, a control signal causing the servo motor to perform an action, as action information, and transmits the control signal generated to the second relay apparatus 82.

Further, also for the action information A to the action information C in the fourth variation described above, one of the first relay apparatus 81 and the second relay apparatus 82 may perform the appropriate conversion.

With the communication system 1G according to the seventh variation of the present embodiment described above, the controller 10 and the puppet 50 can communicate with each other via the network in the communication system 1G. This allows the degree of freedom of the communication system configuration to be improved.

Figure 10:
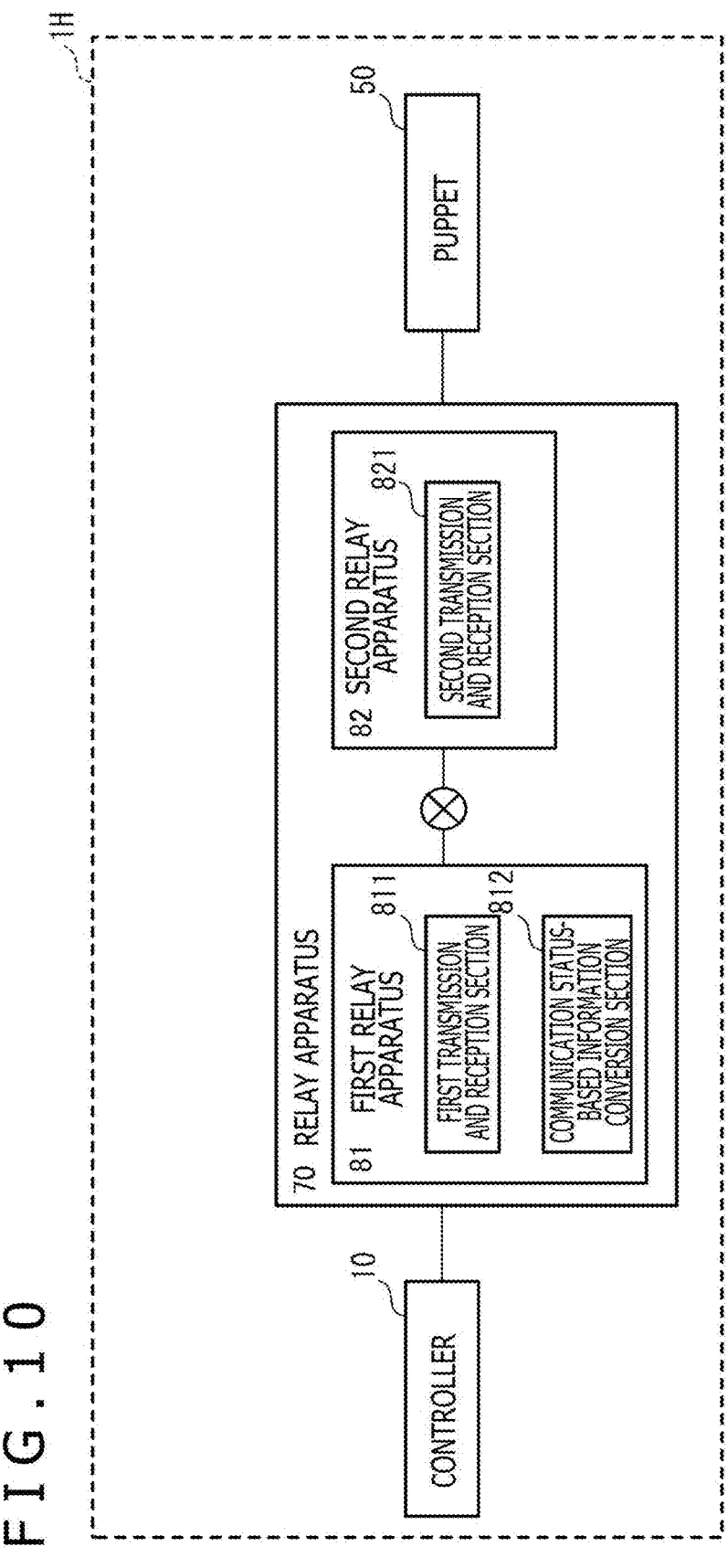
FIG. 10 is a functional block diagram illustrating a configuration of a communication system according to an eighth variation of the embodiment.

[Eighth Variation of Embodiment] FIG. 10 is a functional block diagram illustrating a configuration of a communication system 1H according to an eighth variation.

The communication system 1H is configured in a manner similar to that of the communication system 1 according to the embodiment described above except for the configuration of the relay apparatus 70. Note that, in the description below, the same or substantially the same components as those already described are denoted by the same reference signs and description of these components is omitted.

[Configuration of Communication System] In the communication system 1H, the relay apparatus 70 includes a first relay apparatus 81 and a second relay apparatus 82 as illustrated in FIG. 10.

The first relay apparatus 81 includes a first transmission and reception section 811 and a communication status-based information conversion section 812, and communicates with the controller 10.

The communication status-based information conversion section 812 converts the action information according to a communication status between the first relay apparatus 81 and the second relay apparatus 82. The action information is similar to the action information A to the action information C in the fourth variation described above. The communication status-based information conversion section 812 selects preferred action information from among the action information A to the action information C described above, and converts the selected set of action information as necessary, according to the communication status between the first relay apparatus 81 and the second relay apparatus 82. When selecting the preferred action information, the communication status-based information conversion section 812 may take into account either a quality status related to the communication band of the network or processing load statuses of the first relay apparatus 81 and the second relay apparatus 82.

Further, the user may be able to set what kind of conversion is to be performed according to the communication status between the first relay apparatus 81 and the second relay apparatus 82. Further, besides the action information A to the action information C described above, action information with a different conversion content may be an option. Further, the communication status-based information conversion section 812 may select a plurality of types of action information.

The second relay apparatus 82 includes a second transmission and reception section 821, and communicates with the puppet 50 as the operation target and with the first relay apparatus via the 81 network. The second relay apparatus 82 is a puppet 50-side relay apparatus and may be configured such that the puppet 50 includes the functions of the second relay apparatus 82. Alternatively, the second relay apparatus 82 may include some or all of the functions of the puppet 50.

[Processing in Communication System] The communication status-based information conversion section 812 selects the action information, and converts the selected action information as necessary, according to the communication status between the first relay apparatus 81 and the second relay apparatus 82. Further, in a case where the action information is converted, the converted action information is transmitted from the first transmission and reception section 811 to the second transmission and reception section 821.

With the communication system 1H according to the eighth variation of the present embodiment described above, the controller 10 transmits the preferred action information according to the communication status between the first relay apparatus 81 and the second relay apparatus 82 in the communication system 1H. This allows realization of data transmission and reception with processing loads stably and generally leveled off.

[Combination of Embodiment and Variations] Some or all of the embodiment and variations described above may be performed in combination.

The embodiment illustrates an example in which the controller 10 and the puppet 50 constitute an asymmetric system. However, the controller 10 and the puppet 50 may constitute a symmetric system.

For example, both sides of remote communication may include a set of the controller 10 and the puppet 50, and the operation target of the controller 10 on one side may be the puppet 50 on the other side, whereas the operation target of the controller 10 on the other side may be the puppet 50 on the one side.

Further, for example, both sides of remote communication may include the controller 10, and the controller 10 on one side may be intended to operate the controller 10 on the other side, and vice versa. In such a case, the controller 10 may include some or all of the functions of the puppet 50. Similarly, both sides of remote communication may include the puppet 50, and the puppet 50 on one side may be intended to operate the puppet 50 on the other side, and vice versa. In such a case, the puppet 50 may include some or all of the functions of the controller 10.

Further, also in the asymmetric system including the controller 10 and the puppet 50 as described in the embodiment, the controller 10 may include some or all of the functions of the puppet 50, and the puppet 50 may include some or all of the functions of the controller 10.

For example, with the controller 10 including the second detection section 52 and with the puppet 50 including the stimulus providing section 12, when an external stimulus is provided to the controller 10, the puppet 50 reproduces the external stimulus provided to the controller 10.

Further, for example, with the controller 10 including the driving section 51 and with the puppet 50 including the first detection section 11, when the puppet 50 is operated, the controller 10 reproduces the operation on the puppet 50.

Further, the embodiment and the variations illustrate examples in which the system includes one controller 10. However, the system may include a plurality of controllers 10. In addition, in the system, the number of the controllers 10 may be the same as or different from that of the puppets 50. For example, the system may include a plurality of the controllers 10 and one puppet 50, and the plurality of controllers 10 may be intended to operate the one puppet 50 as a common operation target.

Further, for example, the system may include a plurality of the controllers 10 and a plurality of the puppets 50, and each of the controllers 10 may be intended to operate one or more puppets 50. In addition, for example, the system may include a plurality of the controllers 10 and a plurality of the puppets 50, and one or more of the controllers 10 may be intended to operate each puppet 50.

[Applied Example of Communication System] Applied examples of each of the communication systems described above will be described.

(1) System with Puppets Arranged as Spectators or Audiences

A plurality of the puppets 50 are arranged as spectators or audiences in a venue for sports or entertainments, and users each wearing the controller 10 remotely communicate with the respective puppets 50.

In such a case, the acquisition section 53 of each puppet 50 acquires the imaging information and the sound information concerning surroundings of the puppet 50 and transmits the imaging information and the sound information to the controller 10 intended to operate the puppet 50. This results in transmission of information obtained through the eyes of spectators or audiences actually present in the venue, and each user can output such information by using a display apparatus and a sound output apparatus, improving the realistic sensation in remote communication.

Further, with each controller 10 including the acquisition section 53 and with each puppet 50 including a sound output section to output the sound information, cheers can be given in remote communication.

In addition, in a case where a certain puppet 50 comes into conscious or accidental contact with another puppet 50 or a certain object in the venue, the controller 10 reproduces an external stimulus provided to the puppet 50. Accordingly, an action like putting arms around each other's shoulders or a high five action can be performed via the puppet 50, allowing realization of a sense of togetherness or realistic sensation that is felt when the user is actually present in the venue. Further, when any of the puppets 50 is to be operated, a plurality of controllers 10 can reproduce an external stimulus provided to the puppet 50. In such a case, for example, the plurality of controllers 10 reproduce an external stimulus provided to any puppet 50 by an athlete or an entertainment performer. Therefore, for what are generally called online spectators or audiences, simply dealing with one or a few puppets 50 allows the athlete or entertainment performer to realize remote communication with more users of the controllers 10, who are spectators or audiences.

Further, using, for control in the controller 10, the imaging information and the sound information acquired by the puppet 50 as described in the second variation makes it possible to reproduce an external stimulus according to the situation in the actual venue.

(2) System in which the Puppet is Placed in the Home of the Target User of Remote Communication The puppet 50 is placed in the home of a family member or a friend living away from the user, and the user wearing the controller 10 remotely communicates with the puppet 50.

In such a case, new remote communication can be experienced in which the user feels like actually facing the family member or the friend via the puppet 50. Specifically, for example, when the puppet 50 is remotely driven before conversation to check the target user, or the puppet 50 is remotely driven and the controller 10 is used to reproduce an external stimulus provided to the puppet 50, conversation can be performed with contact with the target user felt as in a hand shake, high five, or the like.

The present disclosure is not limited to the embodiment and variations described above, and includes variations, improvements, and the like to the extent that the object of the present disclosure can be accomplished.

REFERENCE SIGNS LIST

1, 1A, 1B, 1C, 1D, 1E, 1F, 1G, 1H: Communication system
10: Controller
11: First detection section
12: Stimulus providing section
13: Control section
50, 50A, 50B, 50C: Puppet
51: Driving section
52: Second detection section
53: Acquisition section 70: Relay apparatus
71: Switching action determining section
72: Target selecting section
73: Transmission and reception section
74: Type acquisition section
75: Type-based information conversion section
76: Proficiency-based information conversion section
77: Gesture determining section
78: Gesture-based information conversion section
81: First relay apparatus
82: Second relay apparatus
121: Vibration generating section
122: Temperature regulating section
521: Haptic sensor
522: Temperature sensor
811: First transmission and reception section
812: Communication status-based information conversion section

The invention claimed is:

1. A communication system comprising:
a wearable glove;
at least one operation target remotely operated by the wearable glove; and
a relay apparatus that performs relaying between the wearable glove and the at least one operation target,
wherein the wearable glove comprises:
   a first detection section that detects a motion of fingers of the user,
   a stimulus providing section comprising a plurality of actuators embedded in the wearable glove and wherein the plurality of actuators are configured to provide one or more stimuli to a user, wherein the one or more stimuli comprises a tactile stimulus, and a thermal stimulus as an external stimulus directly to the fingers of the user, and
   a control section that controls the stimulus providing section,
wherein the at least one operation target comprises:
   a driving section that operates in reference to action information received, and
   a second detection section comprising sensors configured to detect a temperature stimulus, and a tactile stimulus applied to the at least one operation target, and
wherein the relay apparatus is configured to:
   transmit, to the at least one operation target, the action information based on a detection result from the first detection section, and
   in reference to a detection result from the second detection section, transmit, to the wearable glove, stimulus provision information,
   wherein the control section of the wearable glove is configured to control the stimulus providing section to deliver a stimulus to one or more fingers of the user that matches a type of stimulus including the temperature stimulus detected by the second detection section on the operation target.

2. The communication system according to claim 1, wherein:
the second detection section includes a haptic sensor,
the relay apparatus transmits, to the wearable glove, the stimulus provision information based on a detection result from the haptic sensor,
the stimulus providing section includes a vibration generating section, and the control section causes the vibration generating section to perform an action, in reference to the stimulus provision information.

3. The communication system according to claim 1, wherein:
the second detection section includes a temperature sensor,
the relay apparatus transmits, to the wearable glove, the stimulus provision information based on a detection result from the temperature sensor,
the stimulus providing section includes a temperature regulating section, and
the control section causes the temperature regulating section to perform an action, in reference to the stimulus provision information.

4. The communication system according to claim 1, wherein:
the at least one operation target further includes an acquisition section that acquires at least one of a set of imaging information concerning surroundings of the at least one operation target and a set of sound information concerning the surroundings of the at least one operation target, and
the relay apparatus transmits, to the wearable glove, the at least one of the sets of information acquired by the acquisition section.

5. The communication system according to claim 1, wherein the at least one operation target comprises a plurality of operation targets, and wherein the relay apparatus is configured to:
determine whether or not an action of the fingers detected by the first detection section is a communication target switching action; and
select an operation target corresponding to the communication target switching action from among the plurality of operation targets, as a communication target, when relay apparatus determines the action of the fingers to be the communication target switching action, and
transmit the action information to the communication target and receives the stimulus provision information from the communication target.

6. The communication system according to claim 1, wherein the relay apparatus configured to:
acquire type-based information indicating a type of the at least one operation target, and
convert the action information according to the type information, and
wherein the relay apparatus transmits, to the at least one operation target, the action information converted according to the type information.

7. The communication system according to claim 1, wherein the relay apparatus comprises:
a proficiency-based information conversion section that converts the action information according to a level of proficiency of the user, and transmits, to the at least one operation target, the action information converted by the proficiency-based information conversion section.

8. The communication system according to claim 1, wherein the relay apparatus comprises:
a gesture determining section that determines whether or not the motion of the fingers detected by the first detection section is a gesture causing the at least one operation target to perform a predetermined action, and
a gesture-based information conversion section that converts the action information corresponding to the motion of the fingers into the action information causing the at least one operation target to perform the predetermined action, when the gesture determining section determines the motion of the fingers to be the gesture, and the relay apparatus transmits, to the at least one operation target, the action information converted by the gesture-based information conversion section.

9. The communication system according to claim 1, wherein the relay apparatus comprises a first relay apparatus configured to transmit, receive, and communicates with the wearable glove, and a second relay apparatus configured to transmit, receive, and communicates with the at least one operation target and with the first relay apparatus via a network.

10. The communication system according to claim 9, wherein the first relay apparatus comprises:

a communication status-based information conversion section that converts the action information according to a communication status between the first relay apparatus and the second relay apparatus, and the first relay apparatus transmits, to the second relay apparatus, the action information converted by the communication status-based information conversion section.

11. The communication system according to claim 9, wherein:

the driving section comprises a servo motor, and the relay apparatus generates, according to the motion of the fingers detected by the first detection section, a control signal causing the servo motor to perform an action, as the action information, and transmits the control signal generated to the second relay apparatus.

12. The communication system according to claim 1, wherein the at least one operation target is a puppet including a head section and a pair of arm sections.

\* \* \* \* \*